US012270658B2

(12) United States Patent
Robert et al.

(10) Patent No.: US 12,270,658 B2
(45) Date of Patent: Apr. 8, 2025

(54) METHOD FOR HARMONISING TWO INERTIAL MEASUREMENT UNITS WITH ONE ANOTHER AND NAVIGATION SYSTEM IMPLEMENTING THIS METHOD

(71) Applicant: SAFRAN ELECTRONICS & DEFENSE, Paris (FR)

(72) Inventors: Emmanuel Robert, Paris (FR); Philippe Elie, Paris (FR); Pascal Agostini, Paris (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 0 days.

(21) Appl. No.: 17/055,388

(22) PCT Filed: May 13, 2019

(86) PCT No.: PCT/EP2019/062241
§ 371 (c)(1),
(2) Date: Nov. 13, 2020

(87) PCT Pub. No.: WO2019/219626
PCT Pub. Date: Nov. 21, 2019

(65) Prior Publication Data
US 2021/0116247 A1    Apr. 22, 2021

(30) Foreign Application Priority Data

May 16, 2018 (FR) ..................... 18 54076

(51) Int. Cl.
*G01C 25/00* (2006.01)
*G01C 21/16* (2006.01)
*G01P 15/13* (2006.01)

(52) U.S. Cl.
CPC ......... *G01C 21/166* (2020.08); *G01C 25/005* (2013.01); *G01P 15/13* (2013.01)

(58) Field of Classification Search
CPC .... G01C 21/16; G01C 25/005; G01C 21/166; G01P 15/13
See application file for complete search history.

(56) References Cited

U.S. PATENT DOCUMENTS 5,570,304 A * 10/1996 Mark ..................... G01C 21/16
703/7
10,455,155 B1 * 10/2019 Kalinowski .......... H04N 23/685
(Continued)

FOREIGN PATENT DOCUMENTS

WO    WO2017/081104 A1    5/2017

OTHER PUBLICATIONS

E. Dorveaux and N. Petit, "Harmonization of a multi-sensor navigation system," 2011 International Conference on Indoor Positioning and Indoor Navigation, 2011, pp. 1-7, doi: 10.1109/IPIN.2011.6071944 (Year: 2011).*

Primary Examiner — Michael J Dalbo
Assistant Examiner — Denise R Karavias
(74) Attorney, Agent, or Firm — MUNCY, GEISSLER, OLDS & LOWE, P.C.

(57) ABSTRACT

A method of harmonizing a first inertial measurement unit and a second inertial measurement unit with each other includes the steps of: causing a control unit to compare the vectors measured by the inertial measurement units in order to determine a specific force difference and a rotation difference while taking account of the lever arms between the two measurement units; and causing the control unit to determine a harmonization value from the specific force difference and the rotation difference while taking account of the lever arms between the two measurement units. Navigation apparatus performs the method.

6 Claims, 2 Drawing Sheets

(56) References Cited

U.S. PATENT DOCUMENTS

| | | | | |
|---|---|---|---|---|
| 2004/0030464 | A1* | 2/2004 | Buchler | F41G 7/007 |
| | | | | 701/4 |
| 2009/0326816 | A1* | 12/2009 | Park | G01C 21/165 |
| | | | | 701/501 |
| 2010/0121601 | A1* | 5/2010 | Eckert | G01C 25/005 |
| | | | | 701/500 |
| 2013/0213111 | A1* | 8/2013 | Bourzier | G01C 25/00 |
| | | | | 73/1.78 |
| 2015/0276413 | A1* | 10/2015 | Hickey | G01S 19/23 |
| | | | | 342/357.62 |
| 2016/0116302 | A1* | 4/2016 | Lignon | G01C 21/183 |
| | | | | 73/1.38 |
| 2017/0175948 | A1* | 6/2017 | Zeise | F16M 13/02 |
| 2020/0122830 | A1* | 4/2020 | Anderson | B64C 39/024 |

* cited by examiner

METHOD FOR HARMONISING TWO INERTIAL MEASUREMENT UNITS WITH ONE ANOTHER AND NAVIGATION SYSTEM IMPLEMENTING THIS METHOD

The present invention relates to the field of inertial measurement of a position and/or of an attitude.

STATE OF THE ART

An inertial navigation system (INS) usually incorporates an inertial measurement unit (IMU) comprising three acceleration sensors arranged along the axes of an acceleration measurement reference frame and three angle sensors (which may be rate gyros or free gyros) for measuring angular movements of the acceleration measurement reference frame relative to a reference orientation for the measurement reference frame. Each acceleration sensor comprises a proof mass subjected to gravity and to the accelerations of the object to which the inertial navigation system is secured (e.g. a vehicle). In the acceleration measurement reference frame, the accelerometers measure a magnitude referred to as "specific force" or "g-force" and they determine the three components of a specific force vector. The specific force is equal to the sum of the non-inertial forces to which the inertial body is subjected divided by the mass of the inertial body. The specific force thus has the dimensions of an acceleration and it is also referred to in the literature as "proper acceleration".

First and second inertial navigation systems, both carried by the same vehicle, are harmonized by calculating a rotation matrix for projecting the specific force vectors of the two inertial navigation systems into a common reference frame. This harmonization operation can be performed only by using an inertial navigation program that requires considerable computer resources for its execution. Also, it is necessary for both inertial navigation systems to have sufficient accuracy to enable them to be used for navigation purposes.

OBJECT OF THE INVENTION

An object of the invention is to provide harmonization means that are reliable while being simple.

BRIEF SUMMARY OF THE INVENTION

To this end, the invention provides a method of harmonizing a first inertial measurement unit and a second inertial measurement unit with each other, the first inertial measurement unit and the second inertial measurement unit being connected to a common control circuit and each being arranged to determine a respective specific force vector and a respective instantaneous rotation vector; the method being characterized in that it comprises the steps of:
  causing the control unit to compare with each other at least one of the two vectors determined by each inertial measurement unit in order to determine a difference while taking account of a lever arm between the two inertial measurement units; and
  causing the control unit to determine a harmonization value from said difference while taking account of the lever arm between the two measurement units.

In the method of the invention, the two specific force vectors and/or the two rotation vectors are compared respectively directly with each other, without passing via an inertial reference frame. In the invention, there is thus no need to perform navigation or to compute an inertial reference frame in order to make the comparison. Furthermore, there is therefore no need to have considerable computer resources available nor to have two inertial measurement units of equivalent accuracies.

In a particular implementation, the control unit compares the two specific force vectors in order to determine a specific force difference and compares the two instantaneous rotation vectors in order to determine a rotation difference, and it determines the harmonization value from the specific force difference and from the rotation difference.

The harmonization is then particularly effective.

The invention also provides vehicle navigation apparatus comprising a first inertial measurement unit and a second inertial measurement unit connected to an electronic control unit arranged to perform the method of the invention.

In a particular embodiment, the system includes an optoelectronic instrument having a base and a turret provided with a sighting device and mounted on the base to pivot about a first axis, the second inertial measurement unit being secured to the turret and, preferably, the control unit is arranged to determine a sighting line for the sighting device from the measurements of the second inertial measurement unit, and to project that line into a reference frame of the first inertial measurement unit.

Thus, it is possible to use the optoelectronic instrument for navigation by sighting elements in the surroundings that are of known position, such as landmarks or celestial objects.

Other characteristics and advantages of the invention appear on reading the following description of particular, nonlimiting embodiments of the invention.

BRIEF DESCRIPTION OF THE FIGURES

Reference is made to the accompanying drawings, in which.

DETAILED DESCRIPTION OF THE INVENTION

Figure 1:
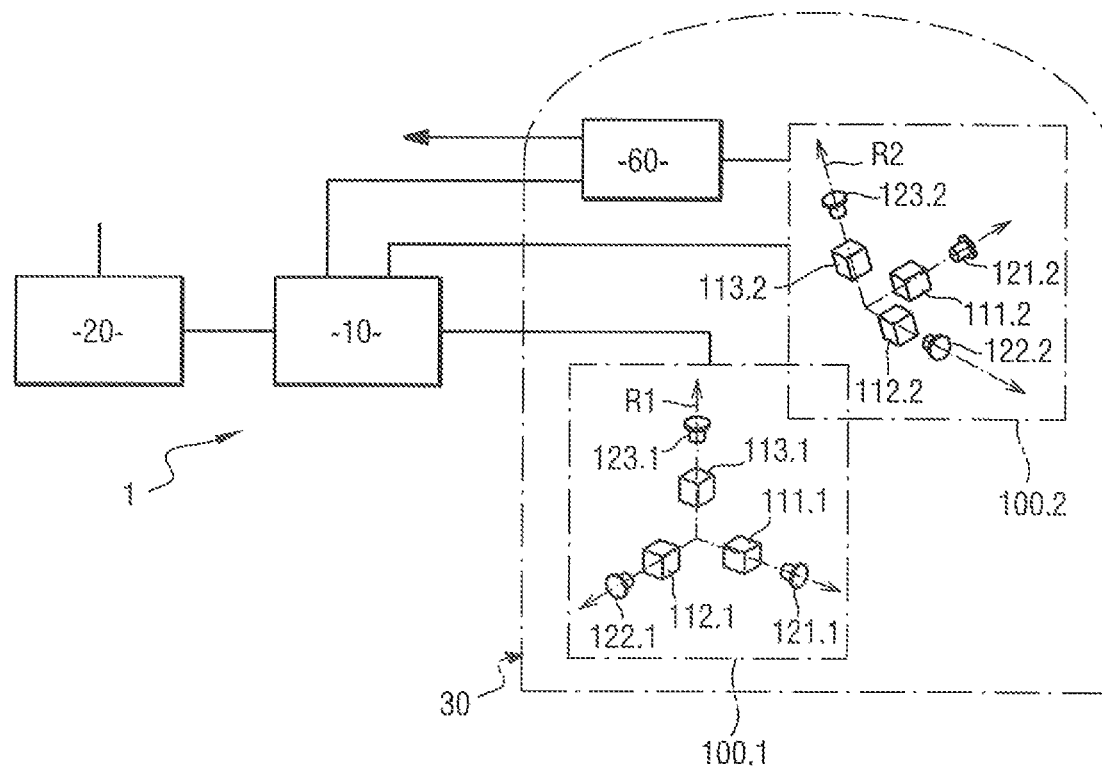
FIG. 1 is a diagrammatic plan view of navigation apparatus performing the method of the invention.
Figure 2:
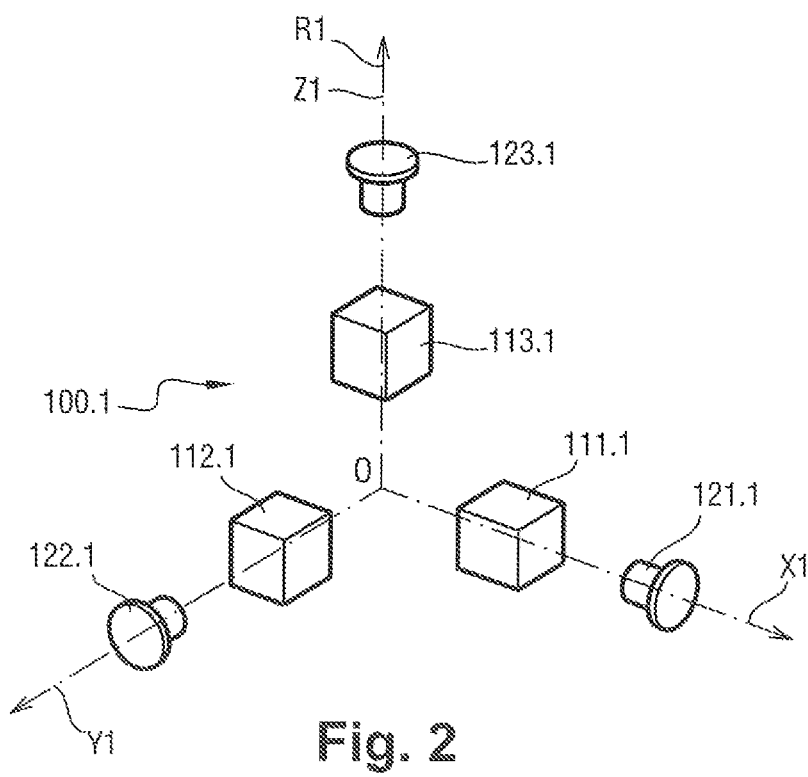
FIG. 2 is a diagrammatic view of an inertial navigation system in the apparatus.

With reference to the figures, the invention relates to navigation apparatus 1 for a vehicle. In this example, the vehicle is a ship; however the invention is applicable in the same manner to any other type of vehicle, whether terrestrial or aerial.

In this example, the navigation apparatus 1 comprises an electronic control unit 10 connected to an electronic satellite geolocation unit 20 and to an optoelectronic instrument 30.

The satellite geolocation unit 20 is arranged in known manner to operate with at least one of the GPS, GALILEO, GLONASS, BAIDU, . . . constellations of satellites.

In known manner, the optoelectronic instrument 30 comprises a base 40 and a turret 50 provided with a sighting device 60 and mounted on the base 40 in order to pivot about a first or "bearing" axis A1. The sighting device 60 is mounted in the turret 50 to pivot about an "elevation" axis A2 perpendicular to the axis A1.

The base 40 includes a motor to adjust the angular position of the turret 50, and thus of the sighting device 60, about the axis A1 relative to the base 40. The base 40 also includes a first inertial navigation system.

The turret 50 includes a motor to adjust the angular position of the sighting device 60 about the axis A2 relative to the turret 50.

The sighting device 60, which is itself known, comprises a support frame 61 carrying an optical assembly 62 with at least one electronic image sensor 63 mounted behind it. In this example, the sighting device 60 also includes a stabilizer device 64 connecting the electronic image sensor 63 to the support frame 61. The stabilizer device comprises actuators, e.g. piezoelectric actuators, connected to a control circuit for moving the electronic image sensor 63 in response to signals coming from an inertial measurement unit 100.2 connected to the control circuit of the stabilizer device.

The inertial navigation system comprises an inertial measurement unit 100.1 incorporating three accelerometers 111.1, 112.1, and 113.1 arranged on the axes X1, Y1, and Z1 of a reference frame R1 of origin O1. The inertial measurement unit 100.1 has three angle sensors 121.1, 122.1, and 123.1 mounted about the axes X1, Y1, and Z1. In this example, the angle sensors 121.1, 122.1, 123.1 are rate gyros with respective vibrating axisymmetric resonators.

The inertial measurement unit 100.2 has three accelerometers 111.2, 112.2, and 113.2 arranged on the axes X2, Y2, and Z2 of a reference frame R2 of origin O2. Three angle sensors 121.2, 122.2, and 123.2 are mounted about the axes X2, Y2, and Z2. In this example, the accelerometers 111.2, 112.2, and 113.2 and the angle sensors 121.2, 122.2, and 123.2 are micro-electromechanical systems (MEMS).

The inertial measurement units 100.1 and 100.2 are positioned in such a manner that their reference frames R1 and R2 are substantially aligned one on the other. Accuracy to within a few degrees is sufficient because subsequently performing the harmonization method of the invention makes it possible to compensate for a difference of a few degrees.

Figure 3:
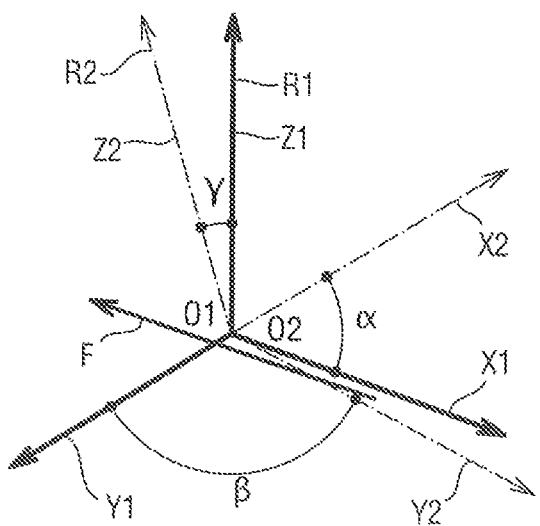
FIG. 3 is a geometrical diagram showing the positioning of the specific force vector in the reference frames of the two inertial navigation systems.
Figure 4:
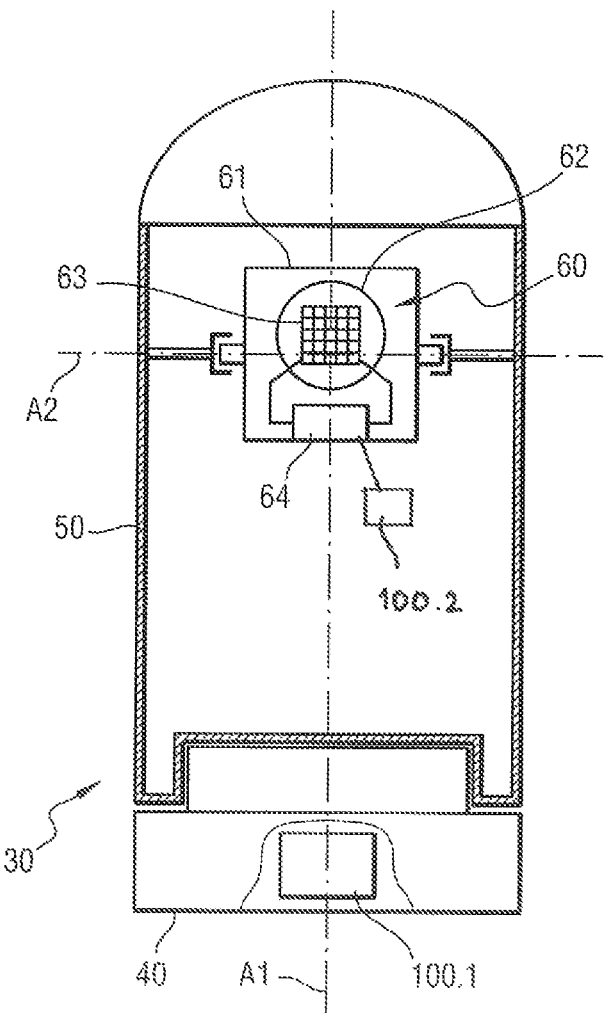
FIG. 4 is a diagrammatic section view of inertial apparatus of the invention.

The inertial measurement units 100.1 and 100.2 are arranged to measure the same specific force in the form of a specific force vector represented by F in FIG. 3. The inertial measurement units 100.1 and 100.2 are also arranged to enable an instantaneous rotation vector to be determined. It should be observed that, in the present embodiment, the two inertial measurement units 100.1 and 100.2 are positioned in the vicinity of each other, i.e. close enough together for the lever arm between them to be negligible.

The electronic control unit 10 is arranged to perform a navigation method using a hybridizing algorithm to combine signals coming from:
    the electronic satellite geolocation unit 20;
    means for performing dead reckoning navigation, such as the on-board compass, chronometer, and log;
    the inertial navigation system incorporating the inertial measurement unit 100.1; and
    the optoelectronic instrument 30.

Hybridizing signals from the satellite geolocation unit 20 and from the inertial navigation system 100.1 is realized in such a manner that the inertial navigation system incorporating the inertial measurement unit 100.1 provides navigation continuity in the absence of signals being received from the electronic satellite geolocation unit 20. This is known per se.

The control unit 10 is also arranged to hybridize signals from the satellite geolocation unit 20 and from the dead reckoning navigation means in such a manner that the dead reckoning navigation means provide navigation continuity in the absence of signals received by the electronic satellite geolocation unit 20. This is also known per se.

Furthermore, the control unit 10 is also arranged to respond to the measurements of the second inertial measurement unit 100.2 in order to determine a sighting line for the sighting device 60 and to project that line into a reference frame of the first inertial measurement unit 100.1. To do this, the sighting device 60 is aimed at geographical references of known position, e.g. celestial objects and/or landmarks.

In order for this navigation to be accurate, it is necessary to harmonize the first inertial measurement unit 100.1 and the second inertial measurement unit 100.2 with each other. The harmonization method is performed by the control unit 10 and it comprises the following steps:
    comparing the signals issued by the inertial measurement units 100.1 and 100.2 that are representative of the specific force vector and of the instantaneous rotation vector in order to determine a specific force difference and a rotation difference between the reference frames R1 and R2 (at this point the lever arm between the two inertial measurement units is ignored); and
    causing the control unit to determine a harmonization value from the specific force difference and from the rotation difference (at this point the lever arm between the two inertial measurement units is ignored).

The specific force vectors are prepared by comparing the outputs from the accelerometers 111.1, 112.1, and 113.1 respectively with the outputs from the accelerometers 111.2, 112.2, and 113.2. In this example, the outputs from the accelerometers are compared in pairs after correcting the normalization of the specific force vectors. The instantaneous rotation vectors are compared by comparing the outputs from the angle sensors 121.1, 122.1, and 123.1 respectively with the outputs from the angle sensors 121.2, 122.2, and 123.2. In this example, the outputs from the angle sensors are compared in pairs after correcting the normalization of the instantaneous rotation vectors. In this example, the outputs from the accelerometers and from the angle sensors are speed increments, i.e. speeds averaged over a given time.

The harmonization value is taken into account for the purpose of taking information from the reference frame associated with the sighting direction and projecting that information into the reference frame R1 in order to be able to make use of that information while hybridizing.

The harmonization method is performed periodically in order to guarantee that both navigation systems are always harmonized with each other. In this example, harmonization is performed in real time.

Naturally, the invention is not limited to the embodiments described and covers any variant coming within the ambit of the invention as defined by the claims.

In particular, both inertial measurement units may be mounted in the same piece of equipment, as in the embodiment described, or else in distinct pieces of equipment.

The control unit may be incorporated in the optoelectronic instrument or it may be separate therefrom.

The second inertial measurement unit 100.2 may be distinct from the optoelectronic instrument 30.

The first inertial navigation system incorporating the inertial measurement unit 100.1 may be distinct from the optoelectronic instrument 30.

If the inertial measurement units are spaced apart from each other, account needs to be taken of the lever arm that exists between the inertial measurement units while comparing the vectors with each other and while determining the harmonization value.

The invention claimed is:

1. Vehicle navigation apparatus including an optoelectronic instrument having a base configured to be attached to a vehicle and a turret provided with a sighting device and mounted on the base to pivot about a first axis, and comprising a first inertial measurement unit secured to the base of the optoelectronic instrument and a second inertial measurement unit secured to the turret and arranged to stabilize the sighting device carried by the turret, the sighting device including a support frame carrying an electronic image sensor, and a stabilizer device which connects the electronic image sensor to the support frame and which comprises actuators connected to a control circuit for moving the electronic image sensor in response to signals coming from the second inertial measurement unit, the first inertial measurement unit and the second inertial measurement unit each being arranged to determine a respective specific force vector and a respective instantaneous rotation vector and both being connected to an electronic control unit arranged to determine a sighting line for the sighting device from the measurements of the second inertial measurement unit, and to project that line into a reference frame of the first inertial measurement unit; the electronic control unit being also arranged to perform a method of harmonizing the first inertial measurement unit and the second inertial measurement unit with each other, said method comprising the steps of:

causing the control unit to compare the two specific force vectors determined by the inertial measurement units between them and the two instantaneous rotation vectors determined by the inertial measurement units between them in order to determine a specific force difference and a rotation difference while taking account of a lever arm between the two inertial measurement units without performing navigation in order to make the comparison and without computing an inertial reference frame in order to make the comparison; and causing the control unit to determine a harmonization value from said difference while taking account of the lever arm between the two measurement units.

2. The vehicle navigation apparatus according to claim 1, wherein each of the first inertial measurement unit and the second inertial measurement unit has three accelerometers, each arranged along a respective axis of the reference frame, and the specific force vectors are compared by comparing the outputs of the accelerometers of the two inertial measurement units in pairs.

3. The vehicle navigation apparatus according to claim 1, wherein each of the first inertial measurement unit and the second inertial measurement unit has three angle sensors, each arranged about a respective axis of the reference frame, and the instantaneous rotation vectors are compared by comparing the outputs from the angle sensors of the two inertial measurement units in pairs.

4. The vehicle navigation apparatus according to claim 1, wherein harmonization is performed periodically.

5. The vehicle navigation apparatus according to claim 1, wherein harmonization is performed in real time.

6. A vehicle comprising a body and a vehicle navigation apparatus including an optoelectronic instrument having a base fixed to the vehicle and a turret provided with a sighting device and mounted on the base to pivot about a first axis, and comprising a first inertial measurement unit secured to the base of the optoelectronic instrument and a second inertial measurement unit secured to the turret and arranged to stabilize the sighting device carried by the turret, the sighting device including a support frame carrying an electronic image sensor, and a stabilizer device which connects the electronic image sensor to the support frame and which comprises actuators connected to a control circuit for moving the electronic image sensor in response to signals coming from the second inertial measurement unit, the first inertial measurement unit and the second inertial measurement unit each being arranged to determine a respective specific force vector and a respective instantaneous rotation vector and both being connected to an electronic control unit arranged to determine a sighting line for the sighting device from the measurements of the second inertial measurement unit, and to project that line into a reference frame of the first inertial measurement unit; the electronic control unit being also arranged to perform a method of harmonizing the first inertial measurement unit and the second inertial measurement unit with each other, said method comprising the steps of:

causing the control unit to compare the two specific force vectors determined by the inertial measurement units between them and the two instantaneous rotation vectors determined by the inertial measurement units between them in order to determine a specific force difference and a rotation difference while taking account of a lever arm between the two inertial measurement units without performing navigation in order to make the comparison and without computing an inertial reference frame in order to make the comparison; and causing the control unit to determine a harmonization value from said difference while taking account of the lever arm between the two measurement units.

\* \* \* \* \*